United States Patent
Pargellis et al.

(10) Patent No.: US 8,458,525 B2
(45) Date of Patent: Jun. 4, 2013

(54) BAYESIAN APPROACH TO IDENTIFYING SUB-MODULE FAILURE

(75) Inventors: Andrew Pargellis, Pomona, CA (US); Brian M. Sutin, Claremont, CA (US)

(73) Assignee: Hamilton Sundstrand Space Systems International, Inc., Windsor Locks, CT (US)

( * ) Notice: Subject to any disclaimer, the term of this patent is extended or adjusted under 35 U.S.C. 154(b) by 571 days.

(21) Appl. No.: 12/727,437

(22) Filed: Mar. 19, 2010

(65) Prior Publication Data
US 2011/0231703 A1 Sep. 22, 2011

(51) Int. Cl.
*G06F 11/00* (2006.01)
(52) U.S. Cl.
USPC ............................................. 714/37
(58) Field of Classification Search
None
See application file for complete search history.

(56) References Cited

U.S. PATENT DOCUMENTS

| | | | |
|---|---|---|---|
| 6,219,626 B1 | 4/2001 | Steinmetz et al. | |
| 7,027,953 B2 | 4/2006 | Klein | |
| 7,088,255 B2 | 8/2006 | Ridolfo et al. | |
| 7,158,958 B2 * | 1/2007 | Przytula et al. | 706/45 |
| 7,536,277 B2 * | 5/2009 | Pattipatti et al. | 702/183 |
| 7,558,771 B2 * | 7/2009 | Barajas et al. | 706/46 |
| 8,126,577 B2 * | 2/2012 | Ticknor et al. | 700/83 |
| 8,165,705 B2 * | 4/2012 | de Kleer et al. | 700/108 |
| 8,171,343 B2 * | 5/2012 | Beg et al. | 714/37 |
| 2007/0300103 A1 * | 12/2007 | Verbowski et al. | 714/37 |
| 2011/0231704 A1 * | 9/2011 | Ge et al. | 714/26 |

FOREIGN PATENT DOCUMENTS

| WO | WO2006105930 A1 | 10/2006 |
|---|---|---|
| WO | 2010/011918 A2 | 1/2010 |

OTHER PUBLICATIONS

The extended European Search Report in counterpart foreign application No. EP 10251785.1 filed Oct. 12, 2010.
Bostrom, Henrik. "Estimating Class Probabilities in Random Forests." Sixth International Conference on Machine Learning and Applications. 2007. pp. 211-216.
Smucker, M. D., et al. "An Investigation of Dirichlet Prior Smoothing's Performance Advantage." CIIR TEchnical Report IR-391, Jan. 2005.

\* cited by examiner

*Primary Examiner* — Michael Maskulinski
(74) *Attorney, Agent, or Firm* — Kinney & Lange, P.A.

(57) ABSTRACT

A diagnostic device identifies failed sub-modules within a larger system based on error codes received from the system. The device stores a likelihood matrix that correlates each sub-module with each possible error code and maintains a likelihood value corresponding to the probability of a failed sub-module generating a corresponding error code and stores a prior probability of failure associated with each sub-module based on prior observational data. In response to received error codes, the device calculates a posterior probability of failure for each of the plurality of sub-modules based on a product of the likelihood values corresponding to the received error codes and the prior probability of failure associated with each sub-module. Based on the calculated posterior probability, the device identifies the sub-module with the highest posterior probability of failure as the failed sub-module.

13 Claims, 3 Drawing Sheets

LIKELIHOOD MATRIX, P(E/U)

| E \ U | $U_1$ | $U_2$ | $U_3$ | $U_4$ | $U_5$ | $U_6$ | $U_7$ | $U_8$ | $U_9$ | $U_{10}$ | $U_{11}$ | $U_{12}$ | $U_{13}$ | $U_{14}$ | $U_{15}$ | $U_{16}$ | $U_{17}$ |
|---|---|---|---|---|---|---|---|---|---|---|---|---|---|---|---|---|---|
| 1000 | 0 | 0 | 0 | 0 | 0 | 0 | 0 | 0 | 0.13 | 0 | 0 | 0 | 0 | 0 | 0 | 0 | 0 |
| 2000 | 0 | 0 | 0 | 0 | 0 | 0 | 0 | 0 | 0.13 | 0.25 | 0 | 0 | 0 | 0 | 0 | 0 | 0 |
| 2002 | 0 | 0 | 0 | 0 | 0 | 0 | 0 | 0 | 0 | 0.25 | 0 | 0 | 0 | 0 | 0 | 0 | 0 |
| 2007 | 0.4 | 1 | 0 | 0 | 0 | 0 | 0 | 1 | 0 | 0 | 0 | 0 | 0.25 | 0 | 0 | 0 | 0 |
| 2008 | 0.4 | 1 | 0 | 0 | 0 | 0 | 0 | 0 | 0 | 1 | 0 | 0 | 0.25 | 0 | 0 | 0 | 0 |
| 3000 | 0 | 0 | 0 | 0 | 1 | 0 | 0 | 0 | 0 | 0 | 0 | 0 | 0 | 0 | 0 | 0 | 0 |
| 3001 | 0 | 0 | 0 | 0 | 0 | 0 | 0 | 0 | 0 | 0 | 1 | 0 | 0 | 0 | 0 | 0 | 0 |
| 4000 | 0 | 0 | 0 | 0 | 0 | 0 | 0 | 1 | 0 | 0 | 0 | 0 | 0 | 0 | 0 | 0 | 0 |
| 4001 | 0 | 0 | 0 | 0 | 0 | 0 | 0 | 0 | 1 | 0 | 0 | 0 | 0 | 0 | 0 | 0 | 0 |
| 4002 | 0 | 0 | 0 | 0 | 0 | 0 | 0 | 0 | 1 | 0 | 0 | 0 | 0 | 0 | 0 | 0 | 0 |
| 4004 | 0 | 0 | 0 | 0 | 0 | 0 | 0 | 0 | 1 | 0 | 0 | 0 | 0 | 0 | 0 | 0 | 0 |
| 4007 | 0 | 0 | 0 | 0 | 0 | 0 | 0 | 0 | 0 | 0 | 1 | 0 | 0 | 0 | 0 | 0 | 0 |
| 4008 | 0 | 0 | 0 | 0 | 0 | 0 | 0 | 0 | 0 | 0 | 0 | 1 | 0 | 0 | 0 | 0 | 0 |
| 4016 | 0 | 0 | 0 | 0 | 0 | 0 | 0 | 0 | 0 | 0 | 0 | 0 | 0 | 0 | 0 | 0 | 0 |
| 4017 | 0 | 0 | 0 | 0 | 0 | 0 | 0 | 0 | 0 | 0 | 0 | 0 | 0 | 0 | 0 | 0 | 0 |
| 5000 | 0 | 0 | 0 | 0 | 1 | 0.05 | 0 | 0 | 0 | 0 | 0 | 0 | 0 | 0 | 0 | 0 | 0 |
| 6001 | 0 | 0 | 0 | 0 | 0 | 0 | 0 | 0 | 0 | 0 | 0 | 0 | 0 | 0 | 0 | 0 | 0 |
| 6003 | 0 | 0 | 0 | 0.05 | 0 | 0 | 0 | 0 | 0 | 0 | 0 | 0 | 0 | 0 | 0 | 0 | 0 |
| 6005 | 0 | 0 | 0 | 0 | 0 | 0 | 0 | 0 | 0.05 | 0 | 0 | 0 | 0 | 0 | 0 | 1 | 0 |
| 6006 | 0 | 0 | 0 | 0 | 0 | 0 | 0 | 0 | 0.05 | 0 | 0 | 0 | 0 | 0 | 0 | 0 | 1 |
| 9001 | 0 | 0 | 0 | 0 | 0 | 0 | 1 | 0 | 0 | 0 | 0 | 0 | 0 | 0 | 0 | 0 | 0 |
| 9004 | 0 | 0 | 1 | 0 | 0 | 0 | 0 | 0 | 0 | 0 | 0 | 0 | 0 | 0 | 0 | 0 | 0 |
| 9006 | 0 | 0 | 0 | 1 | 0 | 0 | 0 | 0 | 0 | 0 | 0 | 0 | 0 | 0 | 0 | 0 | 0 |
| 9105 | 0 | 0 | 0 | 0 | 0 | 0 | 0 | 0 | 0.05 | 0 | 0 | 0 | 0 | 0 | 1 | 0 | 0 |
| 9106 | 0 | 0 | 0 | 0 | 0 | 0 | 0 | 0 | 0.05 | 0 | 0 | 0 | 1 | 0 | 0 | 0 | 0 |
| P(U) | 0.07 | 0.01 | 0.04 | 0.01 | 0.23 | 0.01 | 0.06 | 0.01 | 0.02 | 0.01 | 0.01 | 0.01 | 0.01 | 0.01 | 0.01 | 0.01 | 0.01 |

FIG. 2

BAYESIAN APPROACH TO IDENTIFYING SUB-MODULE FAILURE

STATEMENT OF GOVERNMENT INTEREST

The U.S. Government has a paid-up license in this invention and the right in limited circumstances to require the patent owner to license others on reasonable terms as provided for by the terms of W911SR-09-D-0002 awarded by the Army.

BACKGROUND

The present invention is related to diagnostic tools and in particular to diagnostic tools for identifying failed sub-modules in larger systems.

Complex systems are typically comprised of a plurality of sub-modules. A failure in one or more of the sub-modules may prevent or degrade the performance of system. However, when a system fails it is not always clear which sub-module is at fault. To diagnose failures, each sub-module may include a plurality of sensors (e.g., sometimes, many hundreds of sensors). Outputs from the sensors are collected by a Built-in Test (BIT) system, and in response to one or more of the sensor signals being "out-of-range", an error code (EC) specific to the detected failure is generated.

Based on the generated error code(s), a technician takes an "If . . . . Then . . . . Else" approach to diagnosing which sub-module has failed. That is, IF a specified error code is generated, THEN the technician replaces/tests a first sub-module, ELSE the technician replaces/tests another sub-module, and continues until the failed sub-module is detected. This is a time-consuming and expensive process.

SUMMARY

The present invention provides a method of identifying sub-module failure within a system having a plurality of sub-modules. The method includes receiving one or more error codes from the system. Based on the received error codes, likelihood values corresponding to a probability of a failed sub-module generating the received error code and prior probabilities of failure associated with each sub-module are selected from a likelihood matrix. A posterior probability of failure is calculated for each of the plurality of sub-modules based on the selected likelihood value and the prior probability of failure associated with each sub-module. The failed sub-module is identified based on the calculated posterior probabilities.

A diagnostic device for identifying failed sub-modules within a system includes an input for receiving errors codes from the system, a memory device, and a processor. The memory stores a likelihood matrix that correlates each sub-module with each possible error code and maintains a likelihood value corresponding to the probability of a failed sub-module generating a corresponding error code and stores a prior probability of failure associated with each sub-module based on prior observational data. The processor device executes an algorithm that calculates a posterior probability of failure for each of the plurality of sub-modules based on a product of the likelihood values corresponding to the received error codes and the prior probability of failure associated with each sub-module. Based on the posterior probabilities calculated with respect to each sub-module, the processor device generates an output identifying the sub-module with the highest posterior probability of failure as the failed sub-module.

BRIEF DESCRIPTION OF THE DRAWINGS

FIG. 2 is a table illustrating an exemplary embodiment of a likelihood matrix employed by the diagnostic tool according to an embodiment of the present invention.

DETAILED DESCRIPTION

The present invention provides a Bayesian approach to identifying failed sub-modules. The Bayesian approach calculates probabilities of failure for each sub-module (i.e., posterior probabilities) based on prior probabilities of failure and likelihood data correlating the probability of sub-module failure generating a particular error code. In particular, a lambda-smoothing algorithm is employed to generate prior probabilities of failure given limited observed data.

Figure 1:
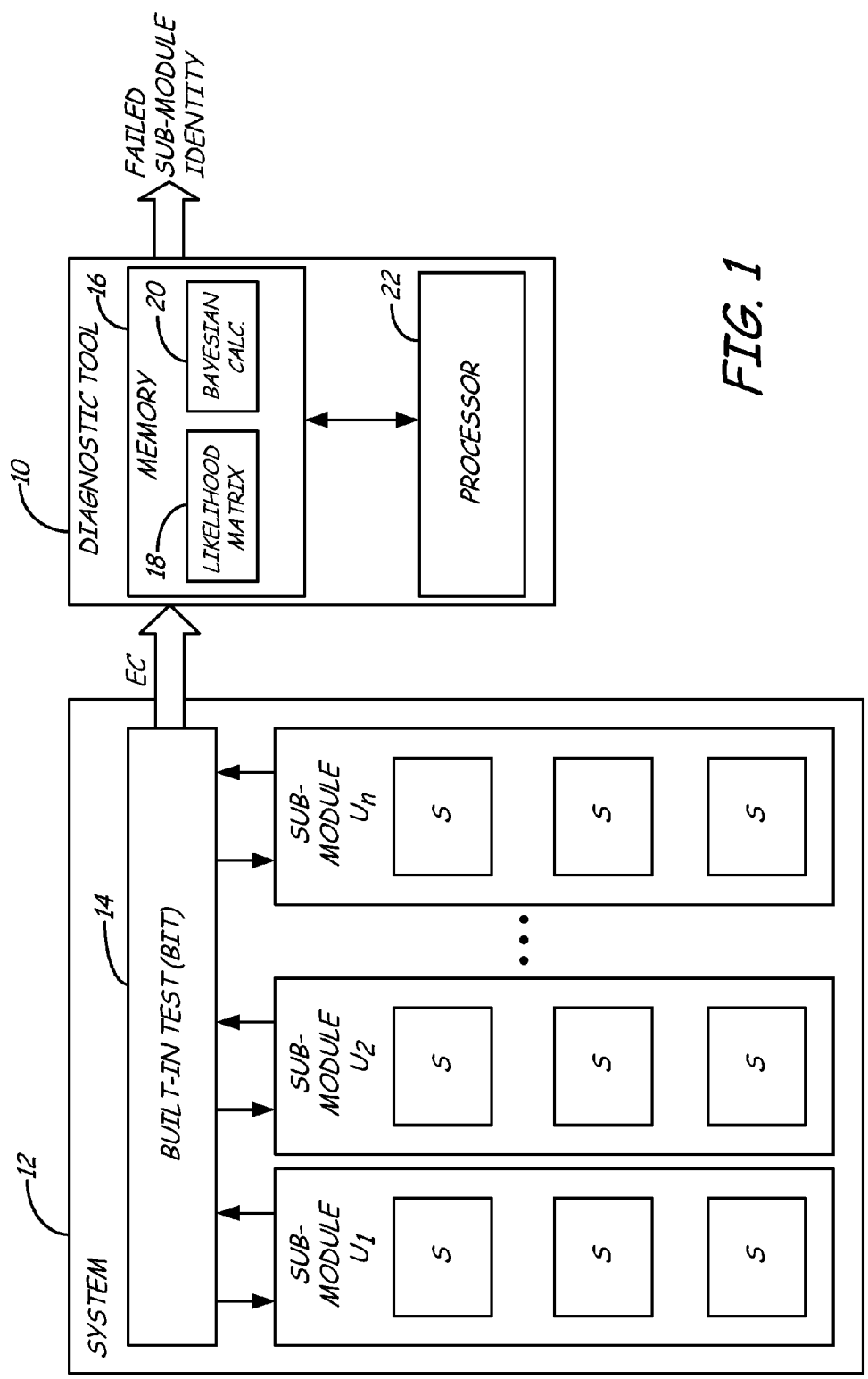
FIG. 1 is block diagram illustrating identification of sub-module failure by a diagnostic tool based on error codes according to an embodiment of the present invention.

FIG. 1 is block diagram illustrating identification of sub-module failure by diagnostic tool 10 within system 12 according to an exemplary embodiment. System 12 includes built-in test (BIT) system 14 and a plurality of sub-modules $U_1$, $U_2$, . . . $U_N$. Each sub-module $U_1$-$U_N$ includes one or more sensors generically labeled S. BIT system 14 sends/receives signals to/from the plurality of sensors S. In response to out-of-range (OOR) sensor outputs, BIT system 14 generates one or more error codes (EC). For example, in one embodiment a temperature sensor provides an out-of-range signal to BIT system 14, which in turn generates a specific error code or codes. However, the term 'error code' refers generally to any output provided by BIT system 14 related to the status and/or health of system 12.

Although based on inputs received from sensors local to various sub-modules, the error codes do not necessarily indicate the sub-module that has failed. In the embodiment shown in FIG. 1, external diagnostic tool 10 includes an input for receiving error codes generated by BIT system 14. Communication between BIT system 14 and external diagnostic tool 10 may employ wireless and/or wired communication protocols, or may allow for error codes displayed by BIT system 14 to be manually entered into diagnostic tool 10. In other embodiments, rather than configuring diagnostic tool 10 external to system 12, diagnostic tool 10 is included as part of system 12, either as a stand-alone module or as part of BIT system 14.

Diagnostic tool 10 includes a combination of hardware and software for identifying failed sub-modules, including memory 16 for storing likelihood matrix 18 and algorithms associated with Bayesian calculator 20 and a processor 22 for executing the stored algorithms to identify the failed sub-module. The memory 16 can be any type of computer-readable storage medium known in the art, such as random access memory, nonvolatile memory, programmable read-only memory, a hard disk device, and the like. The processor 22 can be any type of processing circuitry capable of executing instructions, such as a general purpose processor, digital signal processor, microcontroller, programmable logic device, application specific integrated circuit, and the like. In one embodiment, processor 22 executes a Bayesian algorithm to generate posterior probabilities associated with failure of each sub-module $U_1$-$U_N$ based on the ECs provided by BIT system 14, and ultimately to provide an output identifying the likely failed sub-module. In other embodiments, the output provided by diagnostic tool 10 prioritizes the likelihood of failure of each sub-module $U_1$-$U_N$ (e.g., a list ordered to indicate the most likely failed sub-modules). The output provided by diagnostic tool 10 may be provided in various forms, including being provided on a display included on diagnostic tool 10, as part of a print-out provided by diagnostic tool 10, or as an electronic communication provided by diagnostic tool 10 to another system. Based on the identification of the likely failed sub-module, a technician will replace/repair the identified sub-module. The benefit of this approach is the technician is provided the identity of the sub-module most likely to have failed, thereby reducing the amount of time the technician must spend troubleshooting the failed system 12.

FIG. 2 is a table illustrating an exemplary embodiment of likelihood matrix 18 stored by diagnostic tool 10. Each column in likelihood matrix 18 represents a sub-module $U_1$, $U_2$, ... $U_N$ associated with system 12. Each row (except the last row) in the likelihood matrix 18 represents an error code (EC) that can be generated by BIT system 14. At the intersection of each row and column is the likelihood (i.e., conditional probability, $P(E_i|U_j)$) that a given error code $E_i$ is generated when the corresponding sub-module $U_j$ has failed. The likelihoods for each intersection will be unique to each application, and are generated based on information known about system 12, the sub-modules $U_1$, $U_2$, ... $U_N$, and the error codes (EC) generated. For example, at the intersection of error code '2007' and sub-module $U_1$ is the likelihood value '0.4', which represents that a failure in sub-module $U_1$ should result in error code 2007 being generated forty percent of the time. At the intersection of error code '2007' and sub-module '$U_2$' is the likelihood value '1', which represents that a failure in sub-module $U_2$ should result in the generation of error code '2007' in every instance (i.e., one-hundred percent of the time). However, the converse assumption is not true. That is, the presence of error code '2007' does not represent with one-hundred percent certainty that sub-module $U_2$ has failed. For each cell labeled '0', a failure in the corresponding sub-module will never result in the associated error code being generated.

The final row in likelihood matrix 18 represents the prior probabilities $P(U_j)$ of failure associated with each sub-module. For example, with respect to sub-module $U_1$ the prior probability $P(U_1)$ is equal to '0.07', meaning that seven percent of the time sub-module $U_1$ has been estimated as the cause of system failure. With respect to sub-module $U_2$ the prior probability $P(U_2)$ is equal to '0.01', meaning that only one percent of the time has sub-module $U_2$ been estimated as the cause of system failure.

Various methods exist for estimating prior probability values based on observational data. In each case, additional observations improve the accuracy of prior probability values. In instances in which limited observational data is available, estimation of prior probabilities may lead to either over-estimating the probability of failure or under-estimating the probability of failure. For example, one method of estimating prior probabilities is based only on the number of times a particular sub-module has been observed to fail and the total number of observed failure of system 12.

$$P(U_j) = \frac{c(U_j)}{N} \qquad \text{Equation 1}$$

In Equation 1, $P(U_j)$ is the estimated prior probability, $c(U_j)$ is the number of times a given sub-module has failed, and N is the total number of failures experienced by the instrument. In instances, in which a given sub-module has never been observed to fail (i.e., $c(U_j)$=0), the calculated prior probability will underestimate the likelihood of the sub-module failing as zero.

This problem can be remedied by simply adding one to the count of each sub-module, as provided in Equation 2, $$P(U_j) = \frac{c(U_j)+1}{N+V} \qquad \text{Equation 2}$$

where V is the total number of modules in the instrument that could possibly fail. In the example provided in FIG. 2, V would be set equal to seventeen. However, for systems with small sets of observable data, Equation 2 has the tendency to overestimate the probability of failure for those sub-modules that have not yet been observed to fail. For example, if there have been only two observed failures, both due to sub-module $U_1$, the above equation would generate an estimated prior probability of failure $P(U_1)$ of approximately 0.16, and a prior probability of failure for the remaining sixteen sub-modules of 0.035. This would suggest that subsequent failures are only about five times more likely to be due to sub-module $U_1$ as opposed to another of the sub-modules, but intuition tells us that subsequent failures are much more likely to be due to sub-module $U_1$ than any other module.

To remedy these problems, a lambda-smoothing algorithm is employed as provided in Equation 3, $$P(U_j) = \frac{c(U_j)+(V_s/V)}{N+V_s} \qquad \text{Equation 3}$$

where Vs is the total number of different (unique) sub-modules that have been observed previously to have failed. Using the same example provided with respect to Equation 2, in which two observed failures were both attributed to sub-module $U_1$, then Equation 3 provides a prior probability of failure $P(U_1)$ for sub-module $U_1$ of 0.69 (i.e., 69%), and a prior probability of failure for the remaining sixteen sub-modules of 0.020 (i.e., 2%). This agrees with our intuition that based on the observed data, subsequent failures are more likely to be caused by sub-module $U_1$. A benefit of the lambda-smoothing algorithm is the ability to generate useful prior probabilities of failure $P(U_j)$ for each sub-module based on limited amount of observational data. In particular, applications in which only limited numbers of systems are employed in the field (i.e., tens or hundreds), observational data will remain limited for a long period of time.

Likelihood matrix 18 therefore includes conditional probabilities $P(E_i|U_j)$ regarding the likelihood that a particular error code $E_i$ is generated when a given sub-module $U_j$ has failed, as well as prior probabilities $P(U_j)$ that estimate the likelihood that sub-module $U_j$ is the cause of instrument failure. Given a set of error codes provided by BIT system 14, conditional probabilities $P(E_i|U_j)$ corresponding to the provided error codes and prior probabilities $P(U_j)$ stored by likelihood matrix 18 are selected and provided to Bayesian calculator 20. Based on the selected conditional probabilities $P(E_i|U_j)$ and prior probabilities $P(U_j)$, Bayesian calculator 20 calculates posterior probabilities of failure $P(U_j|E_i)$ for each sub-module. Based on the calculated posterior probabilities of failure $P(U_j|E_i)$, the sub-module most likely to have failed is identified.

Figure 3:
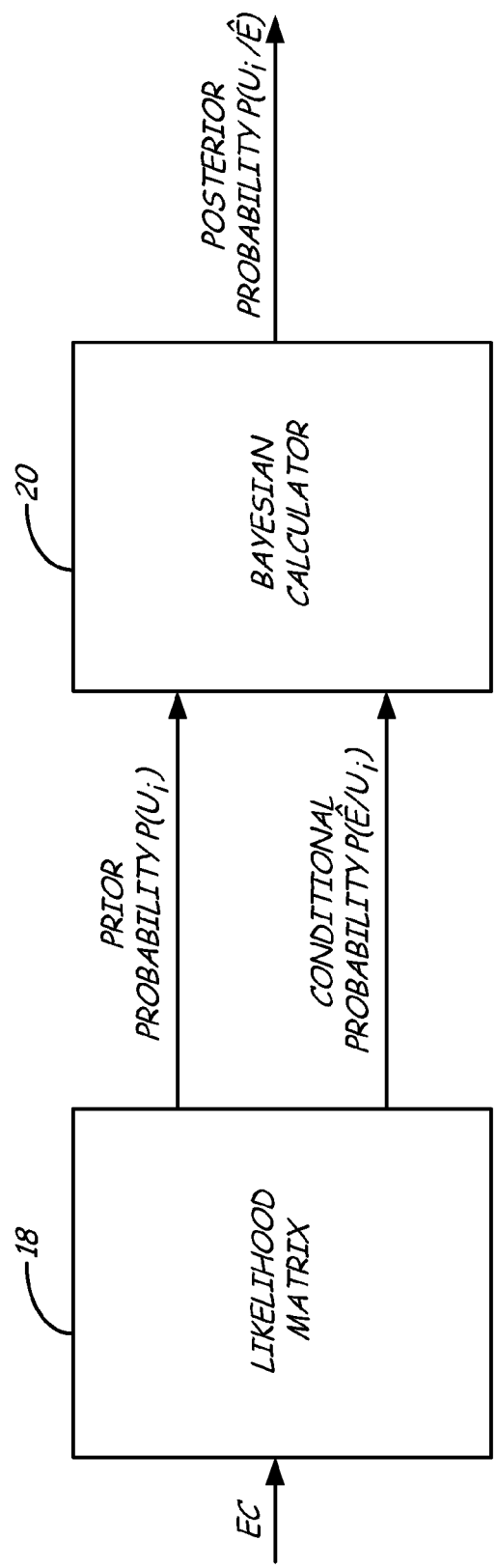
FIG. 3 is a flow diagram illustrating operations performed by the diagnostic tool to generate posterior probabilities of sub-module failure based on a given error code (EC) according to an embodiment of the present invention.

FIG. 3 is a flow diagram illustrating the algorithm executed by processor 22 (shown in FIG. 1) operations performed by diagnostic tool 10 to generate a posterior probability $P(U_j|E_i)$ of sub-module failure based on a given error code (EC) according to an embodiment of the present invention. In response to error codes (EC) provided by BIT system 14, conditional probabilities $P(E_i|U_j)$ are selected by likelihood matrix 18, and are provided together with prior probabilities $P(U_j)$ to Bayesian calculator 20. In response to the selected conditional probabilities $P(E_i|U_j)$ and the prior probability of failure $P(U_j)$ provided by likelihood matrix 18, Bayesian calculator 20 calculates a posterior probability of failure $P(U_j|E_i)$ associated with each sub-module given the specified error code EC. Bayesian calculator 20 then selects the sub-module calculated to have the greatest posterior probability for failure given the specified error code and provides as an output the identified sub-module.

In one embodiment, Bayesian calculator 20 employs Bayes' law to generate the posterior probability of failure for each sub-module $U_1$-$U_N$ of FIG. 1.

$$U_j |_{failed} = \mathrm{argmax} P(U_j | \hat{E}) = \frac{P(\hat{E}|U_j)P(U_j)}{P(\hat{E})} \equiv \frac{P(E_1, E_2, \ldots E_n | U_j) P(U_j)}{P(\hat{E})} \quad \text{Equation 4}$$

The term $\hat{E}$ is the set of error codes (EC) received from BIT system 14. The set may include one or a plurality of error codes. The term argmax represents that the sub-module having the highest (i.e., maximum) posterior probability is identified as the failed sub-module. The term $P(\hat{E})$ is a normalization term where $P(\hat{E})=\Sigma P(\hat{E}|U_j)P(U_j)$. This term is the same for each sub-module $U_1$-$U_N$, so it can be ignored for purposes of classifying which sub-module is most likely to be the cause of the system failure given the set of observed error codes. The right-hand side of Equation 4 is calculated by repeatedly applying Bayes' law on the error code sequence $\hat{E}$ as provided in Equation 5.

$$P(U_j|\hat{E})=P(U_j)P(E_1|U_j)P(E_2|U_j,E_1)P(E_3,E_4,\ldots E_n|U_j, E_1, E_2) \quad \text{Equation 5}$$

Equation 5 provides that error codes can be correlated with one another. For example, the bigram term $P(E_2|U_j,E_1)$ represents the joint probability that two error codes are generated given the failure of a particular sub-module. However, employment of bigrams is only practical in applications in which a large amount of observable data is available to provide correlation between the presence of multiple error codes. In applications in which limited observable data is available, unigram approximation is employed to improve the calculation of the posterior probability.

$$P(U_j | \hat{E}) \sim P(Uj)P(\hat{E} | U_j) \overset{unigram}{\approx} P(U_j) \prod_{E_i \in \hat{E}} P(E_i | U_j) \quad \text{Equation 6}$$

The proportional symbol '~' indicates that the normalizing term $P(\hat{E})$ is being ignored as described above, and that the product is over all error codes $E_i$ in the observed set of error codes $\hat{E}$.

The following examples are provided to illustrate application of Equation 6 with respect to sub-modules $U_1$ and $U_2$. For example, assume that sub-module $U_1$ has failed and BIT system 14 generates a single error code '2007'. Based on the provided error code, likelihood matrix 18 provides the following conditional probability $P(2007|U_1)=0.4$, and prior probability of failure $P(U_1)=0.07$ with respect to sub-module $U_1$. Based on Equation 6, the posterior probability of failure associated with sub-module $U_1$ is calculated as the product of the conditional probability $P(2007|U_1)$ and the probability of failure $P(U_1)$, or $0.07*0.4=0.028$ (i.e., 2.8% chance that sub-module $U_1$ has failed). Similarly, with respect to sub-module $U_2$, likelihood matrix 18 provides the conditional probability $P(2007|U_2)=1$, and prior probability of failure $P(U_1)=0.01$. Based on Equation 6, the posterior probability of failure associated with sub-module $U_2$ is calculated as the product of the conditional probability $P(2007|U_2)$ and the probability of failure $P(U_2)$, or $1*0.01=0.01$ (i.e., 1% chance that sub-module $U_2$ has failed). In this example, the posterior probability of failure of sub-module $U_1$ (2.8%) is greater than the posterior probability of failure of sub-module $U_2$ (1%), and diagnostic tool 16 correctly identifies sub-module $U_1$ as having failed.

Now, assume that sub-module $U_2$ has failed and BIT system 14 generates the set of error codes $\{2007, 2008, 6001\}$. Based on the provided error codes, likelihood matrix 18 provides the following conditional probabilities $P(2007|U_1)=0.4$, $P(2008|U_1)=0.4$, and $P(6001|U_1)=0.2$ and prior probability of failure $P(U_1)=0.07$ with respect to sub-module $U_1$. Based on Equation 6, the posterior probability of failure associated with sub-module $U_1$ is calculated as the product of the conditional probabilities $P(2007|U_1)$, $P(2008|U_1)$, $P(6001|U_1)$ and the probability of failure $P(U_1)$, or $(0.4*0.4*0.2)*0.07=0.0022$ (i.e., 0.22% chance that sub-module $U_1$ has failed). Similarly, with respect to sub-module $U_2$, likelihood matrix 18 provides the conditional probability $P(2007|U_2)=1$, $P(2008|U_2)=1$, and $P(6001|U_2)=1$ and prior probability of failure $P(U_1)=0.01$. Based on Equation 6, the posterior probability of failure associated with sub-module $U_2$ is calculated as the product of the conditional probability $P(2007|U_2)$, $P(2008|U_2)$, and $P(6001|U_2)$ and the probability of failure $P(U_2)$, or $(1*1*1)*0.01=0.01$ (i.e., 1% chance that sub-module $U_2$ has failed). In this example, the posterior probability of failure of sub-module $U_2$ (1%) is greater than the posterior probability of failure of sub-module $U_1$ (0.22%), and diagnostic tool 10 correctly identifies sub-module $U_2$ as having failed.

In this way, diagnostic tool 10 provides an output identifying the sub-module likely to have caused the failure. In other embodiments, rather than identifying a single sub-module likely to have failed, diagnostic tool 10 provides an output prioritizing the likelihood of failure associated with each sub-module. In addition, diagnostic tool 10 may be updated as required, including modifying the both the conditional probabilities and prior probabilities of failure stored by likelihood matrix 18 based on the additional observation data. In addition, likelihood matrix 18 may be expanded to account for new sub-modules. Because the Bayesian approach to calculating posterior probabilities relies on the product of the conditional probability and prior probability for each sub-module, new sub-modules can be accommodated by adding additional columns to likelihood matrix 18.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of identifying sub-module failure within a system having a plurality of sub-modules, the method comprising:
   calculating a prior probability of failure associated with each sub-module based on a lambda-smoothing equation $$P(U_j) = \frac{c(U_j) + (V_s/V)}{N + V_s},$$

wherein $P(U_j)$ is the prior probability of failure associated with each sub-module $U_j$, $c(U_j)$ is a count of the number of times each sub-module has failed, $V_s$ is the number of different sub-modules that have been observed previously to have failed, V is the number of sub-modules includes within the system, and N is the total number of failures experienced by the system;
   receiving one or more error codes from the system;
   selecting from a likelihood matrix at least one likelihood value corresponding to a probability of a failed sub-module generating the received error code and a prior probability of failure associated with each sub-module;
   calculating a posterior probability of failure for each of the plurality of sub-modules based on the selected likelihood value and the prior probability of failure associated with each sub-module; and
   identifying based on the calculated posterior probability associated with each sub-module the sub-module most likely to have failed, wherein the selecting, calculating, and identifying are performed by a diagnostic tool.

2. The method of claim 1, wherein calculating the posterior probability of failure includes multiplying the likelihood values selected based on the received error codes with the prior probability of failure to generate the posterior probability of failure with respect to each sub-module.

3. The method of claim 2, wherein calculating the posterior probability of failure is based on the equation $$P(U_j | \hat{E}) \sim P(U_j)P(\hat{E} | U_j) \overset{unigram}{\approx} P(U_j)\prod_{E_i \in \hat{E}} P(E_i | U_j),$$

wherein $P(U_j|\hat{E})$ is the posterior probability calculated for each sub-module $U_j$, $P(U_j)$ is the prior probability of failure associated with each sub-module $U_j$ and $P(E_i|U_j)$ is the likelihood value corresponding to a probability of a failed sub-module generating the received error.

4. A diagnostic device for identifying failed sub-modules within a larger system, the diagnostic device comprising:
   an input for receiving error codes from the system;
   a memory for storing a likelihood matrix that correlates each sub-module with each possible error code and maintains a likelihood value corresponding to the probability of a failed sub-module generating a corresponding error code and stores a prior probability of failure associated with each sub-module based on prior observational data, wherein the prior probabilities included in the likelihood matrix are calculated with a lambda-smoothing algorithm that is based on a number of observed failures associated with a particular sub-module, a number of sub-modules included within the system, and a number of total observed failures associated with the system; and
   a processor for executing an algorithm that calculates a posterior probability of failure for each of the plurality of sub-modules based on a product of the likelihood values corresponding to the received error codes and the prior probability of failure associated with each sub-module, wherein the processor generates an output identifying the sub-module with the highest posterior probability of failure as the failed sub-module.

5. The diagnostic device of claim 4, wherein the output generated by the processor includes an ordered list of possible sub-module failures based on the posterior probabilities of failure calculated for each of the plurality of sub-modules.

6. The diagnostic device of claim 4, wherein the diagnostic device is internal to the larger system.

7. The diagnostic device of claim 4, wherein the diagnostic device is external to the larger system.

8. The diagnostic device of claim 4, wherein the lambda-smoothing algorithm is defined by the equation $$P(U_j) = \frac{c(U_j) + (V_s/V)}{N + V_s},$$

wherein $P(U_j)$ is the prior probability of failure for each of the plurality of sub-modules $U_j$, $c(U_j)$ is the count of failures associated with each individual sub-module, $V_s$ is the number of unique sub-modules that have been observed to fail, V is the total number of sub-modules included within the system, and N is the total number of observed failures.

9. The diagnostic device of claim 4, wherein the posterior probability of failure for each sub-module is calculated based on a Bayesian method defined by the equation $$P(U_j | \hat{E}) \sim P(U_j)P(\hat{E} | U_j) \overset{unigram}{\approx} P(U_j)\prod_{E_i \in \hat{E}} P(E_i | U_j),$$

wherein $P(U_j|\hat{E})$ is the posterior probability of failure, $P(E_i|U_j)$ is the likelihood value and $P(U_j)$ is the prior probability of failure, wherein for each sub-module the posterior probability of failure $P(U_j|\hat{E})$ for each sub-module Uj is the product of the likelihood values $P(E_i|U_j)$ corresponding to each received error code and the prior probability of failure $P(U_j)$ associated with the sub-module.

10. A diagnostic device for identifying failed sub-modules within a larger system, the diagnostic device comprising:
   memory means for storing a likelihood matrix that includes likelihood values corresponding to a probability of a failed sub-module generating error codes and a prior probability of failure associated with each sub-module, wherein the likelihood values are calculated with a lambda-smoothing algorithm that is based on a number of observed failures associated with a particular sub-module, a number of sub-modules included within the system, and a number of total observed failures associated with the system;
   processor means for calculating a posterior probability of failure for each of the plurality of sub-modules based on likelihood values selected that correspond to the error codes and the prior probability of failure associated with each sub-module; and
   output means for identifying based on the calculated posterior probability of failure associated with each sub-module the sub-module most likely to have failed.

11. The diagnostic device of claim 10 wherein the lambda-smoothing algorithm is defined by the equation $$P(U_j) = \frac{c(U_j) + (V_s/V)}{N + V_s},$$

wherein $P(U_j)$ is the prior probability of failure for each of the plurality of sub-modules $U_j$, $c(U_j)$ is the count of failures associated with each individual sub-module, $V_s$ is the number of unique sub-modules that have been observed to fail, V is the total number of sub-modules included within the system, and N is the total number of observed failures.

12. The diagnostic device of claim 10, wherein the posterior probability of failure for each sub-module is calculated based on a Bayesian method defined by the equation $$P(U_j \mid \hat{E}) \sim P(Uj)P(\hat{E} \mid U_j) \overset{unigram}{\approx} P(U_j) \prod_{E_i \in \hat{E}} P(E_i \mid U_j),$$

wherein $P(U_j|\hat{E})$ is the posterior probability of failure, $P(E_i|U_j)$ is the likelihood value and $P(U_j)$ is the prior probability of failure, wherein for each sub-module the posterior probability of failure $P(U_j|\hat{E})$ for each sub-module Uj is the product of the likelihood values $P(E_i|U_j)$ corresponding to each of the error codes and the prior probability of failure $P(U_j)$ associated with the sub-module.

13. The diagnostic device of claim 10 further comprising means for receiving one or more of the error codes from the system.

* * * * *